United States Patent [19]

Takeda et al.

[11] Patent Number: 5,472,312

[45] Date of Patent: Dec. 5, 1995

[54] WATER LEVEL REGULATING SYSTEM

[75] Inventors: Kenzo Takeda, Ichihara; Kenichi Kurotani, Kawasaki, both of Japan

[73] Assignee: Fuji Electric Co., Ltd., Kanagawa, Japan

[21] Appl. No.: 344,706

[22] Filed: Nov. 21, 1994

Related U.S. Application Data

[63] Continuation of Ser. No. 140,828, Oct. 25, 1993, abandoned.

[30] Foreign Application Priority Data

Oct. 30, 1992 [JP] Japan ..................... 4-315913

[51] Int. Cl.$^6$ ............................ F01B 25/00; F01D 17/00
[52] U.S. Cl. ................. 415/17; 415/24; 415/148; 60/325; 60/398
[58] Field of Search ............... 60/398, 325; 91/361, 91/459; 415/13, 15, 17, 24–148, 151

[56] References Cited

U.S. PATENT DOCUMENTS

| | | |
|---|---|---|
| 2,724,082 | 11/1955 | Hornfeck. |
| 3,730,638 | 5/1973 | Kuwabara ................. 415/24 |
| 3,945,754 | 3/1976 | Hagiya et al. ............ 415/24 X |
| 4,274,260 | 6/1981 | Bukajlo ................. 415/17 X |
| 4,497,171 | 2/1985 | Corrigan et al. .......... 415/151 X |
| 4,611,969 | 9/1986 | Zinsmeyer ................ 415/1 |
| 4,662,817 | 5/1987 | Clark et al. ............ 415/17 X |
| 5,165,845 | 11/1992 | Khalid ................... 415/17 |

OTHER PUBLICATIONS

"Conduite Centralisee et Regulation de Cascades D–Usines Hydroelectriques", Dang Van Mien et al., Journees D'Etudes Organisees Les, Feb. 1978.

S. Endo et al., "Water Passage Simulator and Reservoir Control Method to Small Hydroelectric Power Plant", Shinko Electric Co. Ltd., pp. 77–85, Nov. 1982.

*Primary Examiner*—Edward K. Look
*Assistant Examiner*—Hoang Nguyen
*Attorney, Agent, or Firm*—Spencer, Frank & Schneider

[57] ABSTRACT

A water level regulating system controlling the water level of a head tank of each of a plurality of hydroelectric plant installed in cascade along a stream by using an opening of guide vanes of a hydraulic turbine as a manipulated variable, and the water level of the head tank as a controlled variable. Each hydroelectric plant has a water level regulator constituting the water level regulating system. Each of the water level regulator of an upstream hydroelectric plant and the water level regulator of a downstream hydroelectric plant has a device varying PID parameters for controlling the water level in accordance with the opening of the guide vanes, and a device varying a reference water level to a set water level. The downstream water level regulator further includes a feedforward compensating element which compensates a feedforward signal corresponding to the opening of the guide vanes of the upstream hydroelectric plant, and which varies its compensation characteristic by the opening of the guide vanes of the downstream hydroelectric plant.

8 Claims, 8 Drawing Sheets

WATER LEVEL REGULATING SYSTEM

This application is a continuation of application Ser. No. 08/140,828, filed Oct. 25, 1993, now abandoned.

BACKGROUND OF THE INVENTION

1. Field of the Invention

The present invention relates to a water level regulating system including a plurality of water level regulators, each of which controls the water level of a head tank of individual hydroelectric plants installed in cascade along a water system.

2. Description of Related Art

A conventional water level regulator controls the water level of a head tank by the feedback control. The feedback control is carried out by a PID control using the opening of guide vanes of a hydraulic turbine as a manipulated variable, and the water level of the head tank as a controlled variable. Generally, the parameters of the PID control are fixed.

When a plurality of power plants are installed in cascade along a water system, each power plant is provided with a water level regulator that performs the PID control.

FIG. 1 shows a system which includes a plurality of tanks installed in cascade. In this figure, $TK_1$ designates an upstream head tank, $TK_2$ designates an upstream surge tank, $TK_3$ designates a downstream head tank, $TK_4$ designates a downstream surge tank, $TK_n$ designates an n-th tank, $GV_1$ designates guide vanes of an upstream power plant, and $GV_2$ designates guide vanes of a downstream power plant. In this system, a transfer characteristic of change in water level of each tank has nonlinear characteristics because the time constant of the transfer characteristic changes depending on the volume of water flowing through the water system.

This will be described in more detail. First, a basic characteristic equation indicating the relationship between the water level of a tank and the discharge (the rate of flow) is expressed as follows:

$$A_i \frac{dH_i}{dt} = Q_i - Q_{i+1} \quad (i = 1 \ldots n-1) \tag{1}$$

where $Q_i$ is the rate of inflow to a tank i, $H_i$ is the water level, and $A_i$ is the surface area of the tank i.

The rate of flow through a pipe is expressed by the following equation of motion.

$$\frac{\gamma \cdot S_i \cdot L_i}{g} \frac{dV_i}{dt} = \gamma \cdot S_i \cdot (H_{i-1} - H_i - k_i V_i^2) \tag{2}$$

$(i = 2, 4, \ldots n-1)$ where $\gamma$ is the density of fluid, $S_i$ is the cross-sectional area of a pipe i, $L_i$ is the length of the pipe i, $V_i$ is the velocity of flow in the pipe i, $k_i$ is the friction factor of the pipe i, and g is the acceleration of gravity.

Performing Laplace transform after substituting $S_i V_i = Q_i$ in equation (2), and expanding equation (2) into a Taylor series at a neighborhood of a reference value $Q_{i0}$ of $Q_i$, gives equation (3).

$$\left( \frac{2k_i Q_{i0}}{S_i^2} + \frac{L_i}{gS_i} s \right) Q_i = H_{i-1} - H_i \tag{3}$$

The water level $H_1(s)$ of the upstream head tank $TK_1$ and the water level $H_3(s)$ of the downstream head tank $TK_3$ of FIG. 1 are expressed by equations (4) and (5) by taking the Laplace transform on equations (1) and (3), and then reducing them.

$$H_1(s) = G_{11}(s)Q_1(s) - G_{12}(s)Q_3(s) \tag{4}$$

$$G_{11}(s) = \frac{K_2 + A_2 s + A_2 T_2 s^2}{a_1 s + a_2 s^2 + a_3 s^3}$$

$$G_{12}(s) = \frac{K_2}{a_1 s + a_2 s^2 + a_3 s^3}$$

$$H_3(s) = G_{21}(s)Q_3(s) - G_{22}(s)Q_5(s) \tag{5}$$

$$G_{21}(s) = \frac{K_4 + A_4 s + A_4 T_4 s^2}{b_1 s + b_2 s^2 + b_3 s^3}$$

$$G_{22}(s) = \frac{K_4}{b_1 s + b_2 s^2 + b_3 s^3}$$

Here, the values in equation (4) are expressed by equations (6)–(10), and the values in equation (5) are expressed by equations (11)–(15).

$$K_2 = \frac{S_2^2}{2k_2 Q_{20}} \tag{6}$$

$$T_2 = \frac{L_2 S_2}{2gk_2 Q_{20}} \tag{7}$$

$$a_1 = K_2(A_1 + A_2) \tag{8}$$
$$a_2 = A_1 A_2 \tag{9}$$
$$a_3 = A_1 A_2 T_2 \tag{10}$$

$$K_4 = \frac{S_4^2}{2k_4 Q_{40}} \tag{11}$$

$$T_4 = \frac{L_4 S_4}{2gk_4 Q_{40}} \tag{12}$$

$$b_1 = K_4(A_3 + A_4) \tag{13}$$
$$b_2 = A_3 A_4 \tag{14}$$
$$b_3 = A_3 A_4 T_4 \tag{15}$$

In equations (6) and (7), $Q_{20}$ is a reference flow rate of $Q_2$, and $L_2$ is a pipe length of a pipe associated with $Q_2$, and in equations (11) and (12), $Q_{40}$ is a reference flow rate of $Q_4$, and $L_4$ is a pipe length of a pipe associated with $Q_4$.

From equations (4), (6) and (7), it is seen that the transfer characteristic between the water level $H_1$ of the upstream head tank $TK_1$ and the discharge $Q_3$ through the guide vanes $GV_1$ of the upstream power plant, or the transfer characteristic between the water level $H_1$ and the discharge $Q_1$ flowing into the upstream head tank $TK_1$ changes with the discharge $Q_{20}$ flowing from the upstream head tank $TK_1$ to the surge tank $TK_2$.

In addition, it is seen from equations (5), (11) and (12) that the transfer characteristic between the water level $H_3$ of the downstream head tank $TK_3$ and the discharge $Q_5$ through the guide vanes $GV_2$ of the downstream power plant, or the transfer characteristic between the water level $H_3$ and the discharge $Q_3$ through the guide vanes $GV_1$ of the upstream power plant changes with the discharge $Q_{40}$ flowing from the downstream head tank $TK_3$ to the surge tank $TK_4$.

This presents a problem in that it is difficult for a single stage conventional PID control to ensure a stable and well controlled result. In particular, it is difficult to achieve a high speed response to a change in the rate of inflow through an intake, or to changes in characteristics of the water system to be controlled, which are caused by changes in operation conditions of hydraulic turbines. Thus, stable control of the water levels of the head tanks was difficult.

SUMMARY OF THE INVENTION

It is therefore an object of the present invention to provide a water level regulating system which has a high speed response and stable characteristics to various changing factors of the water levels, thereby eliminating the problem described above.

According to the present invention, there is provided a water level regulating system controlling water levels of head tanks of a plurality of hydroelectric plants installed in cascade along a stream, each of the hydroelectric plants including a hydraulic turbine, guide vanes controlling a discharge flowing through the hydraulic turbine, and a water level regulator which regulates the water level of the head tank as a controlled variable by controlling an opening of the guide vanes as a manipulated variable, the water level regulator of an upstream hydroelectric plant comprising:

means for varying a reference water level of the head tank of the upstream hydroelectric plant in accordance with the opening of the guide vanes of the upstream hydroelectric plant to produce the set water level of the head tank of the upstream hydroelectric plant;

a summing point producing a difference between the set water level and an actual water level of the head tank of the upstream hydroelectric plant as an actuating signal;

a compensator compensating the actuating signal using controlling parameters, and outputting the compensated signal as a first manipulated signal which is supplied to the guide vanes of the upstream hydroelectric plant as the manipulated variable;

means for varying the controlling parameters of the compensator in accordance with the opening of the guide vanes of the upstream hydroelectric plant; and means for supplying the first manipulated signal to the water level regulator of a downstream hydroelectric plant as a feedforward signal;

the water level regulator of the downstream hydroelectric plant comprising:

means for varying a reference water level of the head tank of the downstream hydroelectric plant in accordance with the opening of the guide vanes of the downstream hydroelectric plant to produce the set water level of the head tank of the downstream hydroelectric plant;

a summing point producing a difference between the set water level and an actual water level of the head tank of the downstream hydroelectric plant as an actuating signal;

a compensator compensating the actuating signal using controlling parameters, and outputting the compensated signal as a second manipulated signal;

means for varying the controlling parameters of the compensator in accordance with the opening of the guide vanes of the downstream hydroelectric plant; and means for correcting the second manipulated signal using the feedforward signal supplied from the upstream hydroelectric plant and supplying the corrected signal to the guide vanes of the downstream hydroelectric plant as the manipulated variable.

Here, the correcting means may comprise means for compensating the feedforward signal supplied from the upstream hydroelectric plant in accordance with the opening of the guide vanes of the downstream hydroelectric plant before correcting the second manipulated signal.

The compensator of each of the upstream and downstream hydroelectric plants may be a PID (proportional integral and derivative) compensator, and the controlling parameters are proportional, integral, and derivative parameters.

Each of the controlling parameters may be determined as a function of the opening of the guide vanes, the function being determined in advance.

The means for compensating may compensate the feedforward signal using a ratio of a first transfer function and a second transfer function, the first transfer function being a transfer function between the water level of the head tank of the downstream hydroelectric plant and a discharge flowing through the guide vanes of the upstream hydroelectric plant, and the second transfer function being a transfer function between the water level of the head tank of the downstream hydroelectric plant and a discharge flowing through the guide vanes of the downstream hydroelectric plant.

The means for varying the reference water level of the head tank of the upstream hydroelectric plant may vary the reference water level in accordance with a value proportional to the opening of the guide vanes of the upstream hydroelectric plant, and the means for varying the reference water level of the head tank of the downstream hydroelectric plant may vary the reference water level in accordance with a value proportional to the opening of the guide vanes of the downstream hydroelectric plant.

The compensator may comprise a PI controller whose controlling parameters are fixed, and a gain setter multiplying an output of the PI controller by a gain varied in proportion to the opening of the guide vanes.

The means for correcting may add the feedforward signal to the second manipulated signal, and output the additional result as the manipulated variable.

According to the present invention, the control parameters of the water level control are varied in accordance with the openings of the guide vanes. In addition, the manipulated signal controlling the opening of the upstream guide vanes is added to the manipulated signal controlling the opening of the downstream guide vanes as the feedforward signal. Moreover, the set water levels of the head tanks are varied in accordance with the openings of the guide vanes, or are obtained by correcting the reference water levels by values proportional to the openings of the guide vanes.

As a result, the controller can adapt in a short time to changes in characteristics of the water system to be controlled, which are induced by the changes in the operation state of the hydraulic turbines. Thus, stable and high speed control is implemented.

Furthermore, since the manipulated signal of an upstream plant is applied to a downstream plant as the feedforward signal, the water level of the downstream head tank can be maintained in an allowable range. This makes possible a quick and stable water level control.

In particular, in accordance with one aspect of the present invention, difficulty involved in picking up differential signals and in adjusting parameters, which presents a problem in an actual controller, can be avoided.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

Figure 1:
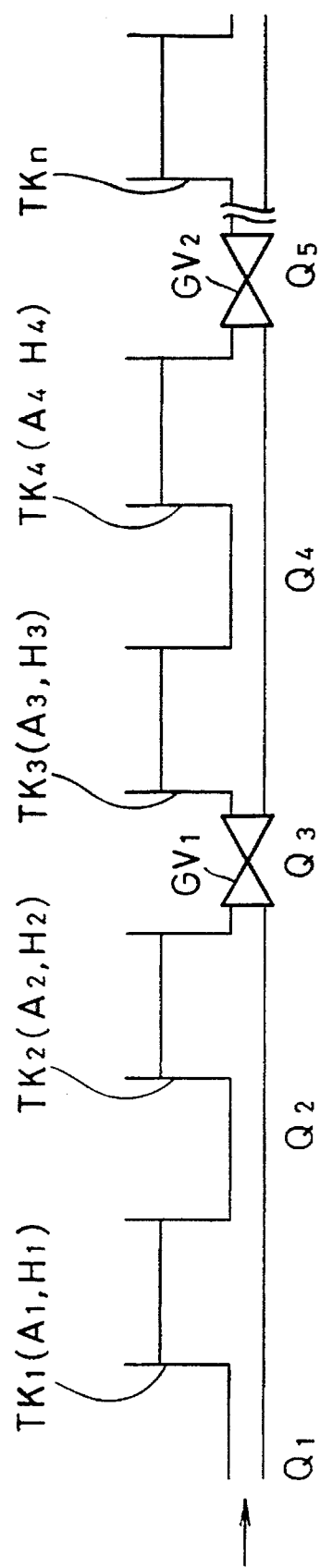
FIG. 1 is a schematic diagram showing a water system in which tanks are installed in cascade.

The invention will now be described with reference to the accompanying drawings.

First, the principle of first and second embodiments in accordance with the present invention will be described. A controller of the first embodiment is provided with a variable PID characteristic expressed by expression (16). This variable PID characteristic is implemented by enabling the PID parameters, which are parameters of the water level control, to be varied in accordance with the openings of the guide vanes.

$$K_i \left( 1 + \frac{1}{T_{Ii}s} + T_{Di}s \right) \quad (i=1, 2) \tag{16}$$

where $K_i = f_1(\phi i)$: proportional gain $T_{Ii} = f_2(\phi i)$: integral time constant $T_{Di} = f_3(\phi i)$: derivative time constant $\phi i$ ($0 \leq \phi i \leq 1$): guide vane opening i=1 (upstream side) or i=2 (downstream side)

Thus, the PID parameters, that is, the proportional gain K, the integral time constant $T_I$, and the derivative time constant $T_D$, are made functions of the guide vane opening $\phi$ which is a manipulated variable.

As mentioned above, since the transfer characteristic relating the discharges and the water level of the head tank to be controlled is changed by the discharge from the head tank to the surge tank, the parameters are also changed in accordance with the discharge. In practice, however, the parameters are changed in accordance with the opening of the guide vanes (a manipulated variable) rather than the discharge from the head tank to the surge tank. This is because the discharge from the head tank to the surge tank equals the discharge from the surge tank when the water system is in an equilibrium state.

The functions $f_1$–$f_3$ are determined such that they take values of optimum PID parameters which have been specified with regard to fixed guide vane openings. In other words, the functions are determined such that they meet the conditions that the time constants of the transfer characteristics increase as the discharges increase as seen from equations (4) and (5).

More specifically, the control parameters are determined as follows:

First, the transfer function $G_{p1}(s)$ relating the water level $H_1$ of the upstream head tank $TK_1$ to the guide vane opening $\phi_1$ is expressed as $$G_{P1}(s) = \frac{2Q_3}{2\phi_1} G_{12}(s) \tag{17}$$

where $\partial Q_3 / \partial \phi_1$ is a ratio of change in the turbine discharge to the change in the guide vane opening $\phi_1$, and $G_{12}(s)$ is given by equation (4). Although the ratio of change $\partial Q_3 / \partial \phi_1$ varies with the guide vane opening $\phi_1$, it is known from characteristic tests of the hydraulic turbine. Since the turbine discharge has one-to-one correspondence with the guide vane opening in a steady state, $G_{p1}(s)$ can be expressed by a particular equation. Once $G_{p1}(s)$ has been known, PID parameters associated with $G_{p1}(s)$ can be determined by various methods such as the limiting-sensitivity method. For example, assuming that the PID parameters determined when the guide vane opening is 100%, 50%, and 10% are $(K_{11}, T_{i11}, T_{D11})$, $(K_{12}, T_{i12}, T_{D12})$, and $(K_{13}, T_{i13}, T_{D13})$, the proportional parameter $K_i$ can be expressed as follows:

$$k_1 = f_1(\phi_1) = k_{const} + k_1\phi_1 + k_2\phi_1^2 \tag{18}$$

where $k_{const}$, $k_1$ and $k_2$ are constants that can be given by the following equation:

$$\begin{pmatrix} k_{const} \\ k_1 \\ k_2 \end{pmatrix} = \begin{pmatrix} 1 & 1 & 1^2 \\ 1 & 0.5 & 0.5^2 \\ 1 & 0.1 & 0.1^2 \end{pmatrix}^{-1} \cdot \begin{pmatrix} K_{11} \\ K_{12} \\ K_{13} \end{pmatrix} \tag{19}$$

The other parameters $T_{i1}$ and $T_{D1}$ can be obtained in similar ways.

In addition, a manipulated signal controlling upstream guide vanes is added to a manipulated signal controlling downstream guide vanes as a feedforward signal. The reason for this is as follows:

As seen from equation (5), the water level $H_3$ of the downstream head tank is influenced by the discharge $Q_3$ flowing through the guide vanes $GV_1$ of the upstream power plant, and the discharge $Q_5$ flowing through the guide vanes $GV_2$ of the downstream power plant. Therefore, the control of the system should be carried out by considering the influence of the upstream guide vanes $GV_1$ as well as that of the downstream guide vanes $GV_2$, while a conventional control of the system is performed by only the downstream guide vanes. For this purpose, the manipulated signal controlling the upstream guide vane opening is added to the manipulated signal controlling the downstream guide vane opening.

In adding a manipulated signal $u_1$ controlling the opening of the upstream guide vanes, the manipulated signal $u_1$ is multiplied by a compensation element F(s) given by the following equation:

$$F(s) = \frac{G_{21}(s)}{G_{22}(s)} \tag{20}$$

where $G_{21}(s)$ is the transfer function from $Q_3$ to $H_3$, and $G_{22}(s)$ is the transfer function from $Q_5$ to $H_3$ in equation (5). The product of the multiplication is added to a manipulated signal $u_2'$ controlling the opening of the downstream guide vanes.

This makes it possible to cancel the effect of the manipulated signal $u_1$, that is, the effect of the discharge $Q_3$. This will be described in more detail. The water level $H_3(s)$ of the head tank $TK_3$ is expressed as follows from equation (4):

$$H_3(s) = G_{21}(s)Q_3(s) - G_{22}(s)Q_5(s) \tag{21}$$

To cancel the effect of the discharge $Q_3(s)$, the following equation must be satisfied.

$$Q_5(s) = \frac{G_{21}(s)}{G_{22}(s)} Q_3(s) = F(s) \cdot Q_3(s) \tag{22}$$

Let us assume that the following equations (23) and (24) hold:

$$Q_3 \approx Q_m \cdot u_1, \quad Q_5 \approx Q_m \cdot u_2 \tag{23}$$

$$u_2 = u_2' + F(s) \cdot u_1 \tag{24}$$

where $Q_m$ is the discharge when the guide vane openings $\phi_1$ and $\phi_2$ are 100%.

Substituting equations (20), (23) and (24) into equation (21) gives $$\begin{aligned} H_3 &= G_{21}(s)Q_m u_1 - G_{22}(s)Q_m\{u_2' + F(s)u_1\} \\ &= -G_{22}(s)Q_m u_2' \end{aligned} \tag{25}$$

This equation indicates that the influence of the upstream manipulated signal $u_1$ on the water level $H_3$ is canceled.

The compensation element $F(s)$ of equation (20) can be expressed by equation (26).

$$F(s) = \frac{K_4 + A_4 s + A_4 T_4 s^2}{K_4} = 1 + \frac{A_4}{K_4} s + \frac{A_3 T_4}{K_4} s^2 \tag{26}$$

where, $K_4$ and $T_4$ are functions of the discharges, that is, of the guide vane openings, and are expressed by the following equations (27)–(28).

$$K_4 = \frac{S_4^2}{2k_4 Q_{40}} \tag{27}$$

$$T_4 = \frac{L_4 S_4}{2g k_4 Q_{40}} \tag{28}$$

in which $Q_{40}$ is the initial flow rate of $Q_4$, and is given by the following equation.

$$Q_{40} \approx Q_{40\text{const}} \times g(\phi_2) \tag{29}$$

where, $Q_{40\text{const}}$ is a reference discharge of $Q_4$, $g(\phi_2)$ is a function representing the relationship between the guide vane opening and the turbine discharge, which is obtained by turbine characteristic tests, $D_4$ is an inside diameter of the pipe associated with $Q_4$, $L_4$ is the pipe length, f is a roughness factor, and $A_i$ is a surface area of the tank $TK_i$.

Thus, the influence of the change in upstream discharge on the downstream side is canceled. Since $F(s)$ contains derivative elements, the order thereof is limited to a practical one. More specifically, the first term (=1) of the right hand side of equation (26) is basically used, and the second and third terms can be added in accordance with the difficulty in picking up derivative signals from the measured data.

In the first embodiment, the compensation element $F(s)$ is varied in accordance with the opening of the downstream guide vanes considering the second and third terms of right hand side of equation (26). In contrast, in a second embodiment described later, the compensation element $F(s)=1$ is used considering only the first term of right hand side of equation (26). This means that the manipulated signal $u_1$ controlling the opening of the upstream guide vanes $GV_1$ is directly added to the manipulated signal $u_2'$ controlling the opening of the downstream guide vanes $GV_2$ in order to obtain the true manipulated signal $u_2$.

The true manipulated signal $u_2$ controlling the opening of the downstream guide vanes $GV_2$ is expressed by equation (24).

A set water level $Sv_i$ of the head tank $TK_i$ of the first embodiment is expressed as a function of the opening $\phi i$ of the guide vanes, and can be varied with the opening $\phi i$ as shown by equation (30).

$$Sv_i = h_i(\phi_i) \tag{30}$$

where $h_i$ represents a function.

On the other hand, the set water level $Sv_i$ of the second embodiment is obtained by correcting a reference water level $Sv_i'$ by a value proportional to the opening $\phi i$ of the guide vanes.

This provides a kind of feedback compensation for the water system, which makes the system more stable.

More specifically, assuming that there is no pipe resistance, the water level is expressed by integral elements of discharges as shown by equation (1). Providing the integral elements with a proportional feedback forms a first order lag element which stabilizes the control, thereby reducing the oscillation induced by the serial disposition of the tanks.

EMBODIMENT 1

Figure 2:
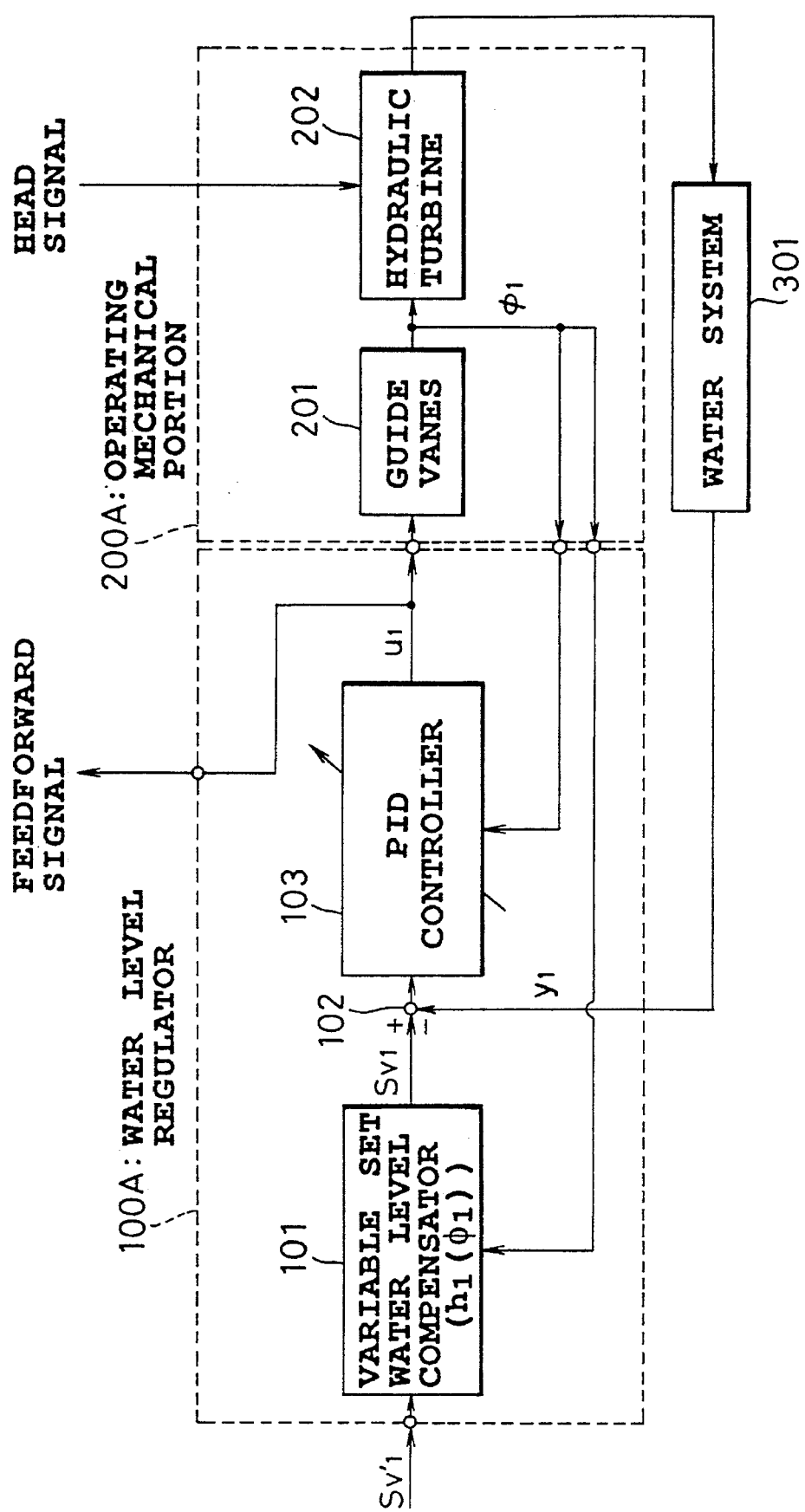
FIG. 2 is a block diagram showing an upstream controller of a first embodiment in accordance with the present invention.
Figure 3:
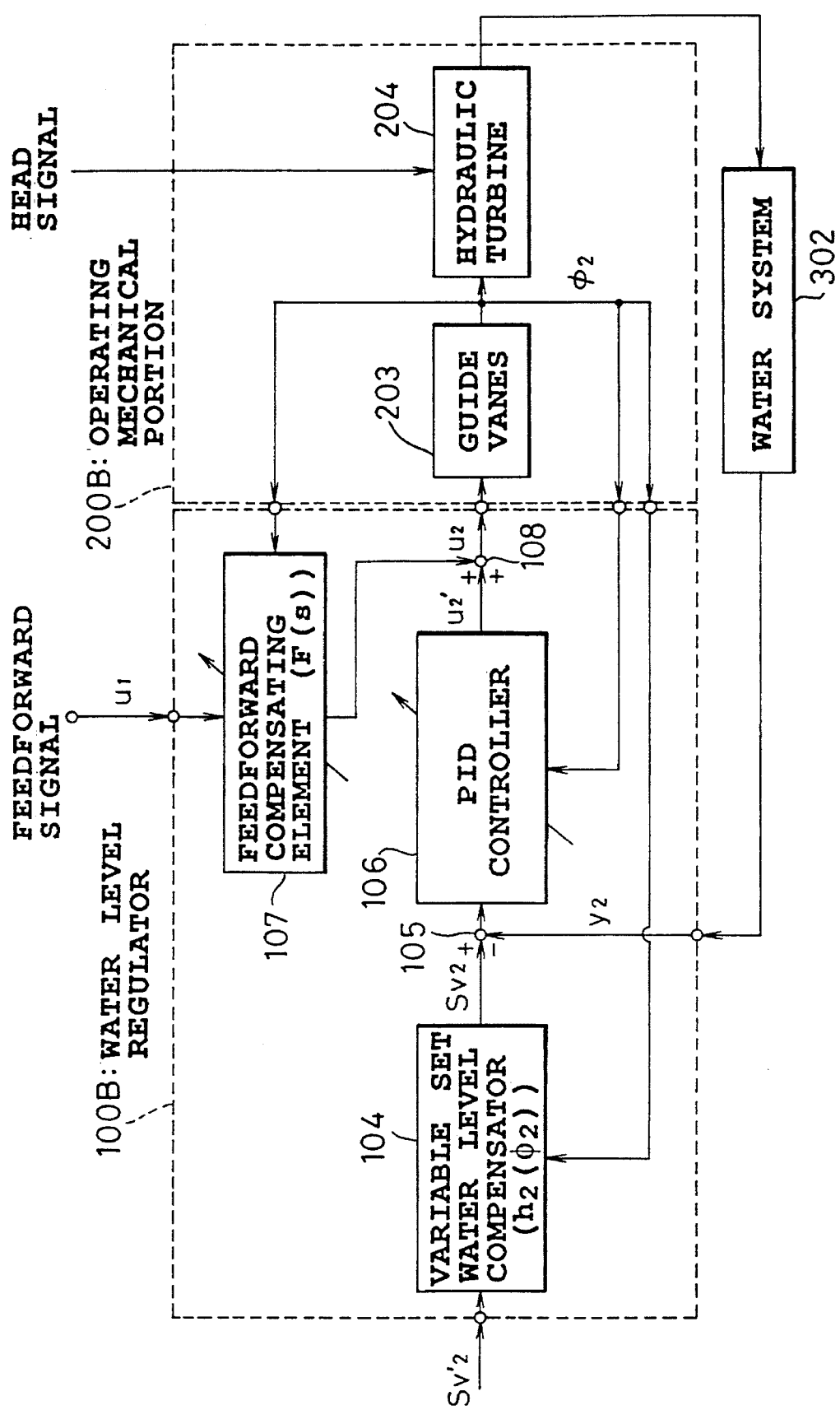
FIG. 3 is a block diagram showing a downstream controller of the first embodiment in accordance with the present invention.

FIGS. 2 and 3 shows a first embodiment in accordance with the present invention. FIG. 2 is a block diagram of a control system of the entire upstream hydroelectric plant including a water level regulator thereof, and FIG. 3 is a block diagram of a control system of the entire downstream hydroelectric plant including a water level regulator thereof.

As shown in these figures, the controllers comprise operating mechanical portions 200A and 200B, water level regulators 100A and 100B, and controlled portions of water systems 301 and 302, respectively. The operating mechanical portion 200A and 200B comprise hydraulic turbines 202 and 204, and guide vanes 201 and 203, respectively. The water level regulators 100A and 100B include governors controlling the guide vanes 201 and 203, and the water systems 301 and 302 each comprise the head tank, the surge tank and guide pipes.

The upstream water level regulator 100A of FIG. 2 comprises a variable set water level compensator 101, an adder 102, and a PID controller 103. On the other hand, the downstream water level regulator 100B of FIG. 3 comprises a variable set water level compensator 104, an adder 105, a PID controller 106, a feedforward compensating element 107, and an adder 108.

In FIGS. 2 and 3, $Sv_1'$ and $Sv_2'$ are reference water levels of the upstream and downstream head tanks, $Sv_1$ and $Sv_2$ are set water levels, $u_1$ is a manipulated signal controlling the opening of the upstream guide vanes, $u_2$ and $u_2'$ are manipulated signals controlling the opening of the downstream guide vanes, $\phi_1$ and $\phi_2$ are openings of the guide vanes, and $y_1$ and $y_2$ are actual water levels of the upstream and downstream head tanks.

The water level regulators 100A and 100B are characterized in that the PID parameters (the control parameters of the water level regulation) of the PID controllers 103 and 106, and the set water levels $Sv_1$ and $Sv_2$ of the head tanks are made variable in accordance with the openings $\phi_1$ and $\phi_2$ of the guide vanes, which correspond to the manipulated variables.

Furthermore, the downstream water level regulator is characterized in that it includes the compensating element 107 whose characteristics are variable in accordance with the opening $\phi_2$ of the guide vanes of the downstream plant, and that it obtains the true downstream manipulated signal $u_2$ by adding the upstream manipulated signal $u_1$ that has passed through the feedforward compensating element 107 to the downstream manipulated signal $u_2'$ which is outputted from the PID controller 106 to control the opening of the guide vanes.

Next, the operation of the water level regulator of the upstream plant will be described.

First, the actual water level $y_1$ of the head tank is detected as the feedback signal, and the difference between the water level $y_1$ and the set water level $Sv_1$ is determined. The control is carried out such that the difference between the set water level $Sv_1$ and the actual water level $y_1$ becomes zero. To accomplish this, the difference is obtained by the adder 102, and is applied to the PID controller 103 comprising a proportional gain, an integrator, and a differentiator. The output of the PID controller 103 is the manipulated signal $u_1$ controlling the opening of the guide vanes of the hydraulic turbine 202.

In the meantime, since the discharge changes in accordance with the opening of the guide vanes, the characteristics of the water system 301 to be controlled are also changed. To cope with this change, the control parameters of the PID controller 103 are varied in accordance with the opening $\phi_1$ of the guide vanes $GV_1$ as described before. In addition, the set water level $Sv_1$ is also varied in accordance with the opening $\phi_1$ of the guide vanes $GV_1$. This will increase the damping of the oscillation of the water level.

The operation of the water level regulator of the downstream plant in FIG. 3 is basically similar to that of the upstream plant in FIG. 2 except for the operation of the compensating element 107. The compensating element 107 outputs the product $F(s) \times u_1$ obtained by multiplying the manipulated signal $u_1$ controlling the opening $\phi_1$ of the upstream guide vanes $GV_1$ by the compensation element $F(s)$ which is varied in accordance with the opening $\phi_2$ of the downstream guide vanes $GV_2$. This product is added to the manipulated signal $u_2'$ controlling the opening of the guide vanes, which is outputted from the PID controller 106. Thus, the true downstream manipulated signal $u_2$ given by equation (24) is generated.

This makes it possible to achieve control considering the influence of the discharge through the upstream guide vanes.

EMBODIMENT 2

Figure 4:
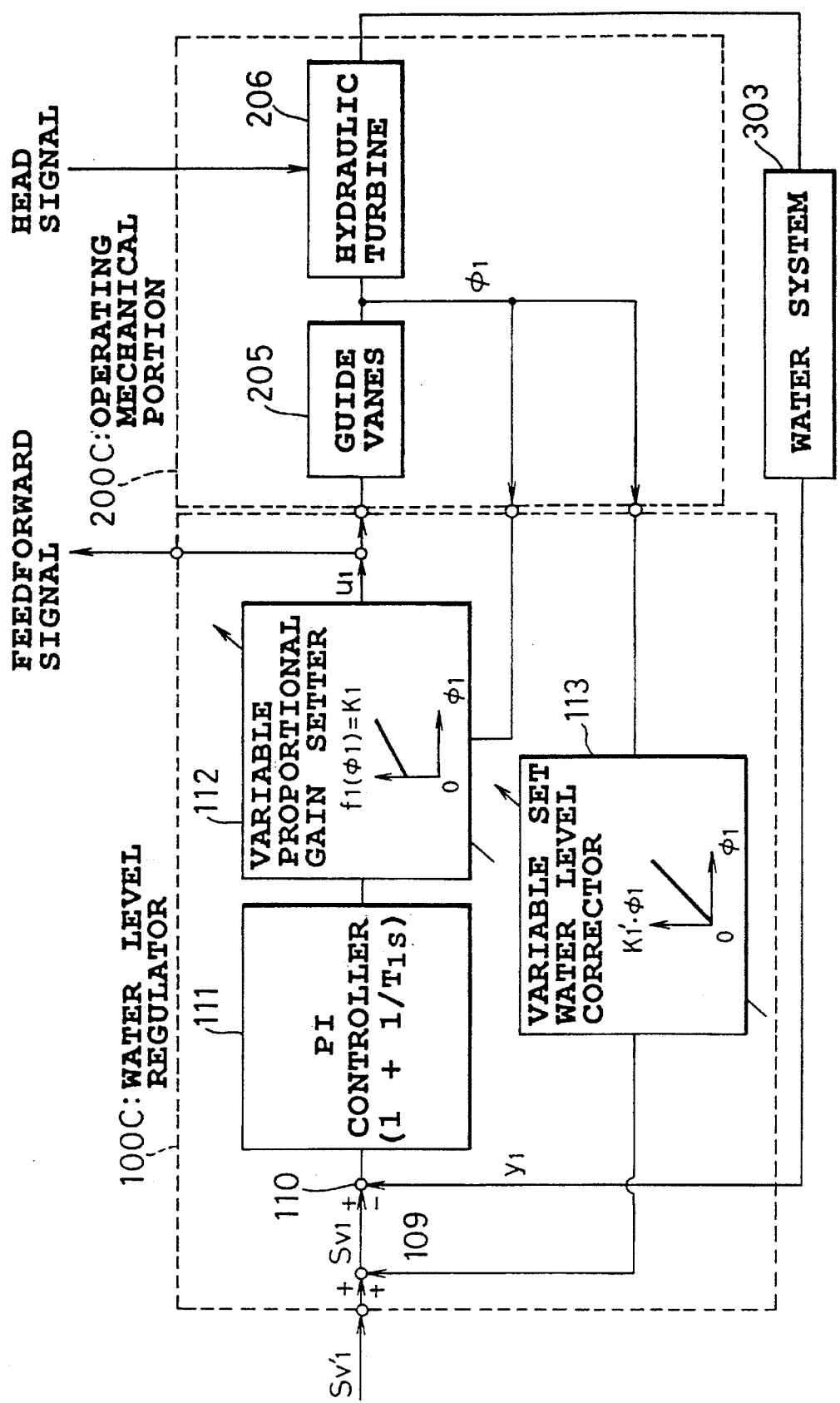
FIG. 4 is a block diagram showing an upstream controller of a second embodiment in accordance with the present invention.
Figure 5:
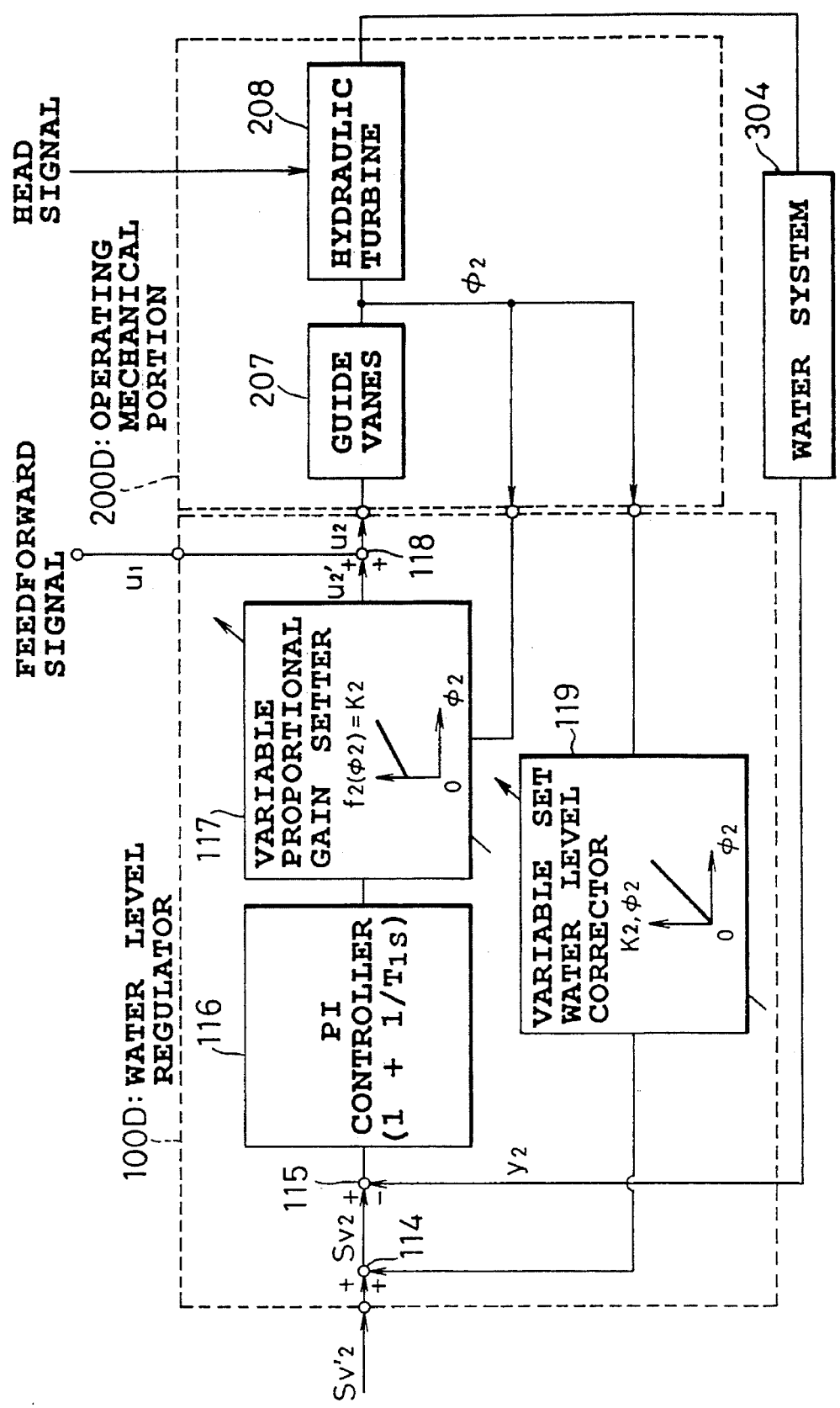
FIG. 5 is a block diagram showing a downstream controller of the second embodiment in accordance with the present invention.

Referring to FIGS. 4 and 5, a second embodiment in accordance with the present invention will be described. FIG. 4 is a block diagram of a control system of the entire upstream hydroelectric plant including a water level regulator thereof, and FIG. 5 is a block diagram of a control system of the entire downstream hydroelectric plant including a water level regulator thereof.

The individual controllers comprise operating mechanical portion 200C and 200D, water level regulators 100C and 100D, and controlled portions of water systems 303 and 304, respectively. The operating mechanical portions 200C and 200D comprise hydraulic turbines 206 and 208, and guide vanes 205 and 207, respectively. The water level regulators 100C and 100D include governors controlling the guide vanes 205 and 207, and the water systems 303 and 304 each comprise the head tank, the surge tank and guide pipes.

The upstream water level regulator 100C of FIG. 4 comprises adders 109 and 110, a PI (proportional integral) controller 111, a variable proportional gain setter 112, and a variable set water level corrector 113. On the other hand, the downstream water level regulator 100D of FIG. 5 comprises adders 114, 115 and 118, a PI controller 116, a variable proportional gain setter 117, and a variable set water level corrector 119.

In implementing a practical control system, it is difficult to pick up a differential signal because of various noise entering into the measured signal, and to adjust parameters of elements constituting the control system when it is a complicated one. The second embodiment is implemented in view of these facts.

The operation of the upstream water level regulator of FIG. 4 and the downstream water level regulator of FIG. 5 will be described.

First, the water levels $y_1$ and $y_2$ of the head tanks, which constitute the feedback signals, are detected, and the differences between the levels $y_1$ and $y_2$ and the set water levels $Sv_1$ and $Sv_2$ are obtained by the adders 110 and 115. The control is carried out such that the differences between the set water levels $Sv_1$ and $Sv_2$ and the actual water levels $y_1$ and $y_2$ become zero. To accomplish this, the differences are supplied to the PI controllers 111 and 116, each of which comprises a proportional gain and an integrator. The outputs of the PI controllers 111 and 116 are supplied to the gain setters 112 and 117, respectively. The gain setter 112 outputs the manipulated signal $u_1$ controlling the opening of the guide vanes 205 of the hydraulic turbines of the upstream plant. On the other hand, the gain setter 117 outputs the manipulated signal $u_2'$, and supplied it to the adder 118. The adder 118 adds the manipulated signal $u_2'$ to the feedforward signal $u_1$ supplied from the upstream plant, and outputs the manipulated signal $u_2$ controlling the opening of the guide vanes 207 of the downstream plant.

Since the openings $\phi_1$ and $\phi_2$ of the guide vanes change the discharges, the characteristics of the water systems 303 and 304 to be controlled will be changed as described before. To cope with the changes, the proportional gains of the PI controllers 111 and 116 are changed in accordance with the openings $\phi_1$ and $\phi_2$ of the guide vanes using the variable proportional gain setters 112 and 117.

The variable PI characteristics of the upstream PI controller 111 are determined using expression (31) based on expression (16). Likewise, the variable characteristics of the downstream PI controller 116 are determined using expression (32).

$$K_1 \left( 1 + \frac{1}{T_{I1}s} \right) \tag{31}$$

where $K_1 = f_1(\phi_1)$: upstream proportional gain $T_{I1}$=const: upstream integral time constant $f_1(\phi_1) = k_1 \times \phi_1 + k_{const1}$ $k_{const1}$: upstream reference proportional gain $k_1$: upstream proportional coefficient $$K_2 \left( 1 + \frac{1}{T_{I2}s} \right) \tag{32}$$

where $K_2 = f_2(\phi_2)$: downstream proportional gain $T_{I2}$=const: downstream integral time constant $f_2(\phi_2)=k_2\times\phi_2+k_{const2}$ $k_{const2}$: downstream reference proportional gain $k_2$: downstream proportional coefficient In addition, variable set water level correctors 113 and 119 correct the reference water levels $Sv_1'$ and $Sv_2'$ to the set water levels $Sv_1$ and $Sv_2$ by values proportional to the openings $\phi_1$ and $\phi_2$ of the guide vanes.

The set water levels are obtained by correcting the reference water levels using equation (33) based on equation (30) for the upstream water level, and equation (34) for the downstream water level.

$$Sv_1=h_1(\phi_1)=k_1'\cdot\phi_1+Sv_1' \qquad (33)$$

where $Sv_1$: upstream set water level $\phi_1$: opening of upstream guide vanes $Sv_1'$: upstream reference water level $k_1'$: upstream proportional coefficient $$Sv_2=h_2(\phi_2)=k_2'\cdot\phi_2+Sv_2' \qquad (34)$$

where $Sv_2$: downstream set water level $\phi_2$: opening of downstream guide vanes $Sv_2'$: downstream reference water level $k_2'$: downstream proportional coefficient The feedforward signal $u_1$ from the upstream plant to the downstream controller (that is, the manipulated signal $u_1$ controlling the opening of the upstream guide vanes 205) is accepted through the compensation element F(s) whose transfer function is given by equation (35) derived from equation (26).

$$F(s)=1 \qquad (35)$$

In other words, the upstream manipulated signal $u_1$ is used as the feedforward signal without change.

Figure 6:
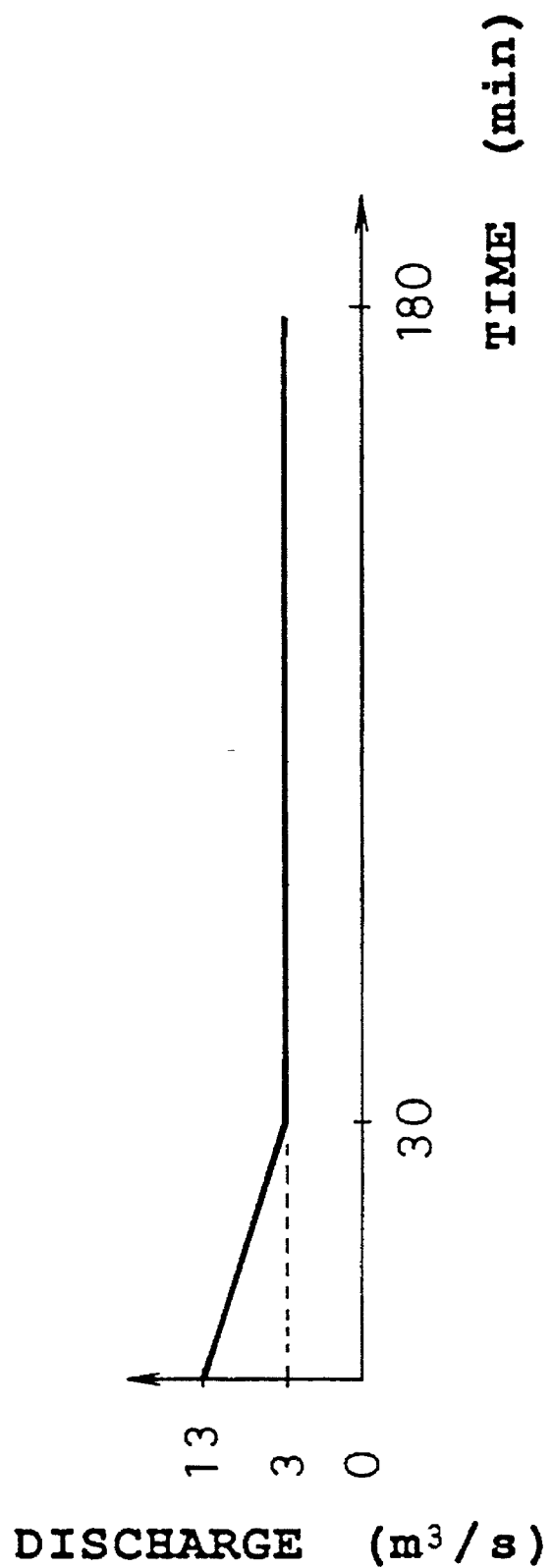
FIG. 6 is a graph showing the changes in an intake amount versus time in simulations.
Figure 7A:
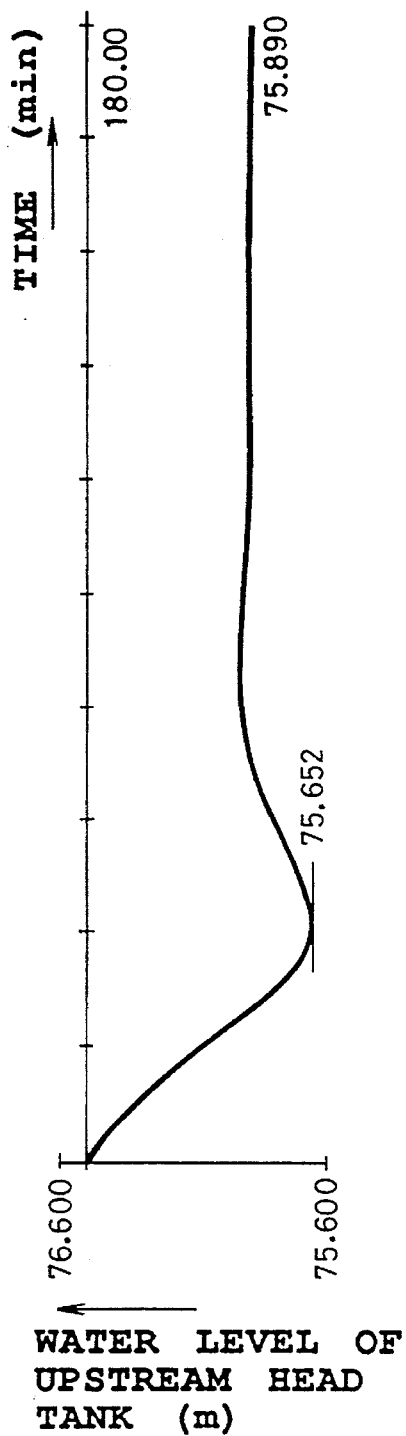
FIGS. 7A and 7B are graphs illustrating results of a simulation by the first or second embodiment.
Figure 7B:
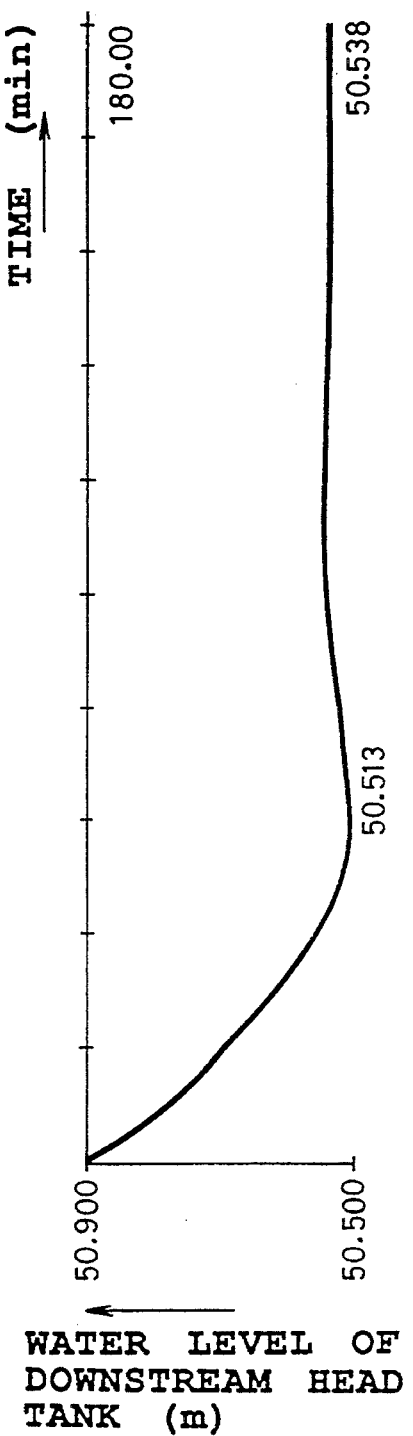
Figure 8A:
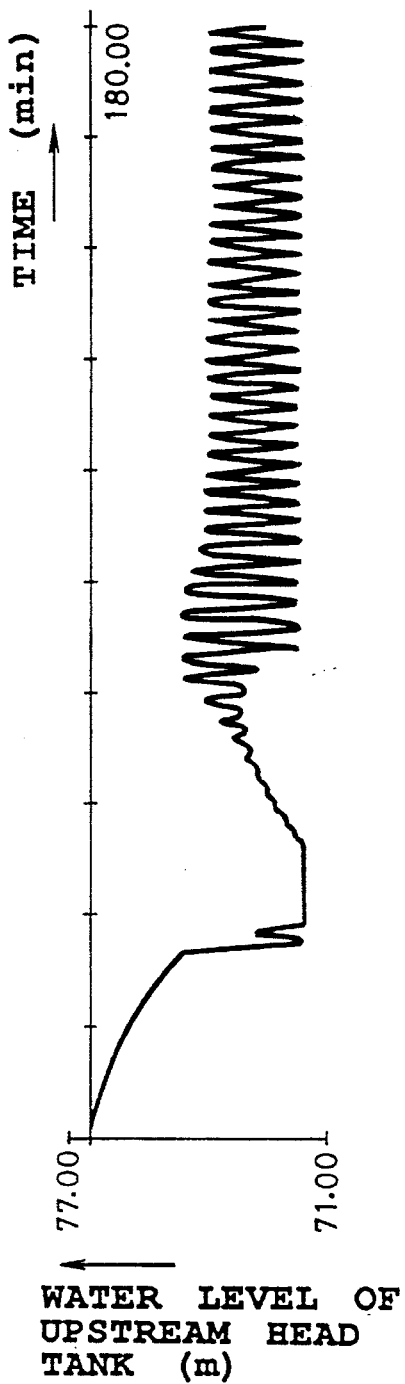
FIGS. 8A and 8B are graphs illustrating results of a simulation by a conventional technique.
Figure 8B:
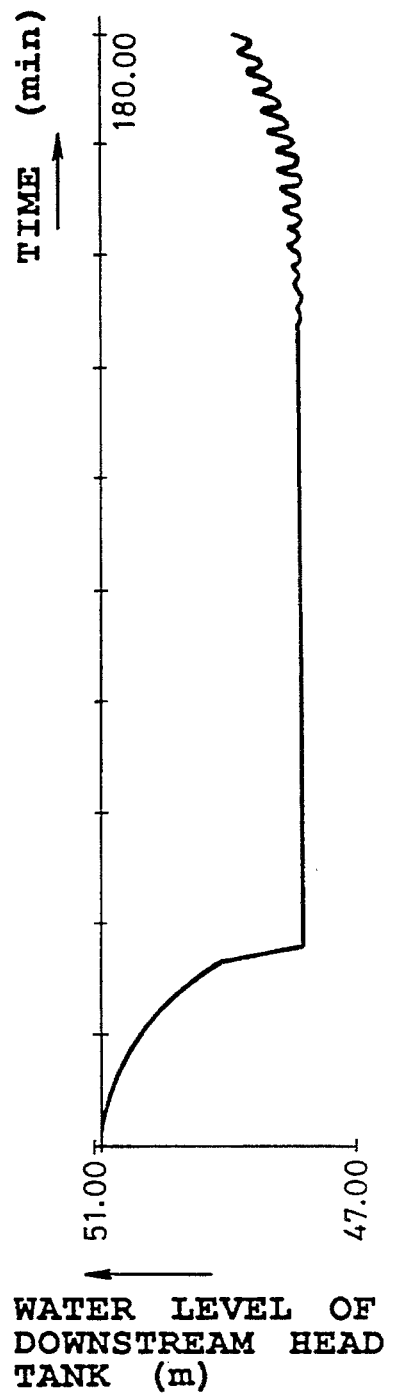

FIGS. 7A and 7B illustrate results of simulations carried out in terms of the water system in FIG. 1 using the controllers of the first or second embodiment, and FIGS. 8A and 8B are results of simulations in terms of a conventional system. The simulations were carried out assuming that the discharge change as shown in FIG. 6 occurred at the intake of the water system as shown in FIG. 1, and the water levels of the upstream head tank were obtained as shown in FIGS. 7A and 8A, and the water levels of the downstream head tank were obtained as shown in FIGS. 7B and 8B. In this simulation, the following conditions are assumed:

$$\begin{aligned}K_1 &= 25(0.33+0.67\phi_1)\\K_2 &= 80(0.33+0.67\phi_1)\\T_{I1} &= 480 \text{ sec}\\T_{I2} &= 960 \text{ sec}\\S_{v1} &= 0.7\phi_1+75.8\\S_{v2} &= 0.3\phi_2+50.5\end{aligned} \qquad (36)$$

It is seen from FIGS. 7A and 7B, the water levels of the upstream and downstream head tanks each converge on water levels matching the reduced discharge in short time periods owing to the variable water level set elements.

In contrast with this, according to the conventional system, the water levels of the tanks oscillate, and are reduced near the bottom level as shown in FIGS. 8A and 8B.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A water level regulating system controlling water levels of head tanks of a plurality of hydroelectric plants installed in cascade along a stream, each of said hydroelectric plants including a hydraulic turbine, guide vanes controlling a discharge flowing through the hydraulic turbine, and a water level regulator which regulates the water level of the head tank as a controlled variable by controlling an opening of the guide vanes as a manipulated variable, said water level regulator of an upstream hydroelectric plant comprising:

means for varying a reference water level of the head tank of the upstream hydroelectric plant in accordance with the opening of the guide vanes of the upstream hydroelectric plant to produce a set water level of the head tank of the upstream hydroelectric plant;

a summing point producing a difference between the set water level and an actual water level of the head tank of the upstream hydroelectric plant as an actuating signal;

a compensator compensating the actuating signal using controlling parameters, and outputting the compensated signal as a first manipulated signal which is supplied to the guide vanes of the upstream hydroelectric plant as the manipulated variable;

means for varying the controlling parameters of said compensator in accordance with the opening of the guide vanes of the upstream hydroelectric plant; and means for supplying the first manipulated signal to the water level regulator of a downstream hydroelectric plant as a feedforward signal;

said water level regulator of the downstream hydroelectric plant comprising:

means for varying a reference water level of the head tank of the downstream hydroelectric plant in accordance with the opening of the guide vanes of the downstream hydroelectric plant to produce a set water level of the head tank of the downstream hydroelectric plant;

a summing point producing a difference between the set water level and an actual water level of the head tank of the downstream hydroelectric plant as an actuating signal;

a compensator compensating the actuating signal using controlling parameters, and outputting the compensated signal as a second manipulated signal;

means for varying the controlling parameters of said compensator in accordance with the opening of the guide vanes of the downstream hydroelectric plant; and means for correcting the second manipulated signal using the feedforward signal supplied from the upstream hydroelectric plant and supplying the corrected signal to the guide vanes of the downstream hydroelectric plant as the manipulated variable.

2. The water level regulating system as claimed in claim 1, wherein said correcting means comprises means for compensating the feedforward signal supplied from the upstream hydroelectric plant in accordance with the opening of the guide vanes of the downstream hydroelectric plant before correcting the second manipulated signal.

3. The water level regulating system as claimed in claim 1, wherein said compensator of each of said upstream and downstream hydroelectric plants is a PID proportional integral and derivative compensator, and said controlling parameters are proportional, integral, and derivative parameters.

4. The water level regulating system as claimed in claim 3, wherein each of said controlling parameters is determined as a function of the opening of the guide vanes, said function being determined in advance.

5. The water level regulating system as claimed in claim 2, wherein said means for compensating compensates the feedforward signal using a ratio of a first transfer function and a second transfer function, said first transfer function being a transfer function between the water level of the head tank of the downstream hydroelectric plant and a discharge flowing through the guide vanes of the upstream hydroelectric plant, and said second transfer function being a transfer function between the water level of the head tank of the downstream hydroelectric plant and a discharge flowing through the guide vanes of the downstream hydroelectric plant.

6. The water level regulating system as claimed in claim 1, wherein said means for varying the reference water level of the head tank of the upstream hydroelectric plant varies the reference water level in accordance with a value proportional to the opening of the guide vanes of the upstream hydroelectric plant, and said means for varying the reference water level of the head tank of the downstream hydroelectric plant varies the reference water level in accordance with a value proportional to the opening of the guide vanes of the downstream hydroelectric plant.

7. The water level regulating system as claimed in claim 6, wherein said compensator comprises a proportional integral controller whose controlling parameters are fixed and a gain setter multiplying an output of the proportional integral controller by a gain varied in proportion to the opening of the guide vanes.

8. The water level regulating system as claimed in claim 7, wherein said means for correcting adds the feedforward signal to the second manipulated signal, and outputs the additional result as the manipulated variable.

* * * * *